(12) United States Patent
Ashley et al.

(10) Patent No.: US 6,209,582 B1
(45) Date of Patent: Apr. 3, 2001

(54) 2-WAY COLLAR AND O-RING SEAL ASSEMBLY

(75) Inventors: Gregory R. Ashley, Amherst; Thomas M. Huber, Lakewood, both of OH (US)

(73) Assignee: Honeywell Commercial Vehicle Systems Company, Elyria, OH (US)

( * ) Notice: Subject to any disclaimer, the term of this patent is extended or adjusted under 35 U.S.C. 154(b) by 0 days.

(21) Appl. No.: 09/579,036

(22) Filed: May 26, 2000

(51) Int. Cl.[7] .................................................. F16K 11/044
(52) U.S. Cl. .......................................................... 137/625.5
(58) Field of Search ........................... 137/625.5; 251/357

(56) References Cited

U.S. PATENT DOCUMENTS

| | | | | |
|---|---|---|---|---|
| 3,126,915 | * | 3/1964 | Hunt | 137/625.5 |
| 3,183,933 | * | 5/1965 | Whitlock | 137/625.5 |
| 5,080,133 | | 1/1992 | Johnson et al. | |

* cited by examiner

*Primary Examiner*—John Fox

(57) ABSTRACT

First and second collars cooperate with first and second seal members separated by a retaining ring assembled onto a valve piston. The collars selectively engage the valve housing at one end and the retaining ring at the other end to limit the travel of the piston between first and second positions. Moreover, the assembly offers a cost effective alternative to the bonded rubber seals provided on known piston arrangements.

18 Claims, 3 Drawing Sheets

2-WAY COLLAR AND O-RING SEAL ASSEMBLY

BACKGROUND OF THE INVENTION

1. Field of the Invention

This invention relates to a control valve assembly and more particularly to an isolation valve that requires a two-way seal.

2. Discussion of the Art

One common use of an isolation valve is to provide a pneumatic backup in the event of an electronics failure associated with an electronic braking system (EBS). The isolation valve includes first and second seal assemblies on a movable piston that alternately and selectively isolate supply pressure to an outlet or delivery port from either a traditional pneumatic braking system or the electronic braking system. Typically, the two supply ports that communicate with a valve chamber are axially spaced apart. Consequently, movement of the piston between first and second positions alternately isolates one of the supplies from the delivery port.

An insert and bonded rubber sealing element is commonly used on the piston to engage the valve seat associated with the first and second positions of the piston. That is, opposite faces of the insert have an elastomer or rubber material integrally bonded thereon. Although an effective seal is provided, the insert and bonded rubber sealing element is a relatively expensive item. Thus, a need exists for a suitable substitute that provides effective isolation, i.e., two-way seals, at a significantly reduced manufacturing cost.

SUMMARY OF THE INVENTION

The present invention overcomes the problems associated with the prior art arrangements and provides an effective, economical assembly.

According to a preferred embodiment, a valve housing has a chamber with first, second, and third ports in communication therewith. A piston is received in the chamber and moves between first and second positions, providing selective communication between the first and third ports or between the second and third ports. A seal assembly on the piston includes a retaining ring that cooperates with first and second collars, and first and second seal members mounted on the piston.

According to a further aspect of the invention, the retaining ring is disposed between the collars and dimensioned for abutting engagement therewith and the collars maintain the seal members in place on the piston.

According to another aspect of the invention, the retaining ring is a split ring, while the first and second collars are complete annuli, wherein the retaining ring has an internal diameter less than an inner diameter of the first and second collars.

According to a preferred method of installation, a first seal member is received in a first groove on the piston. Subsequently, a first collar and then the retaining ring are advanced on the piston. A second seal member is received in a second groove. A second collar is subsequently positioned in place abutting the retaining ring previously secured to the piston.

A further aspect of the method of assembly includes the step of installing the second seal member prior to installing the second collar.

A primary benefit of the invention resides in the substantially reduced costs to manufacture the valve assembly.

Another benefit of the invention resides in the effective operation of the valve assembly.

Still another benefit of the invention resides in the ease with which the valve is assembled without any loss in valve performance.

Still other features and benefits of the present invention will become apparent to those skilled in the art upon a reading and understanding of the following detailed description.

DETAILED DESCRIPTION OF THE PREFERRED EMBODIMENT

Figure 1:
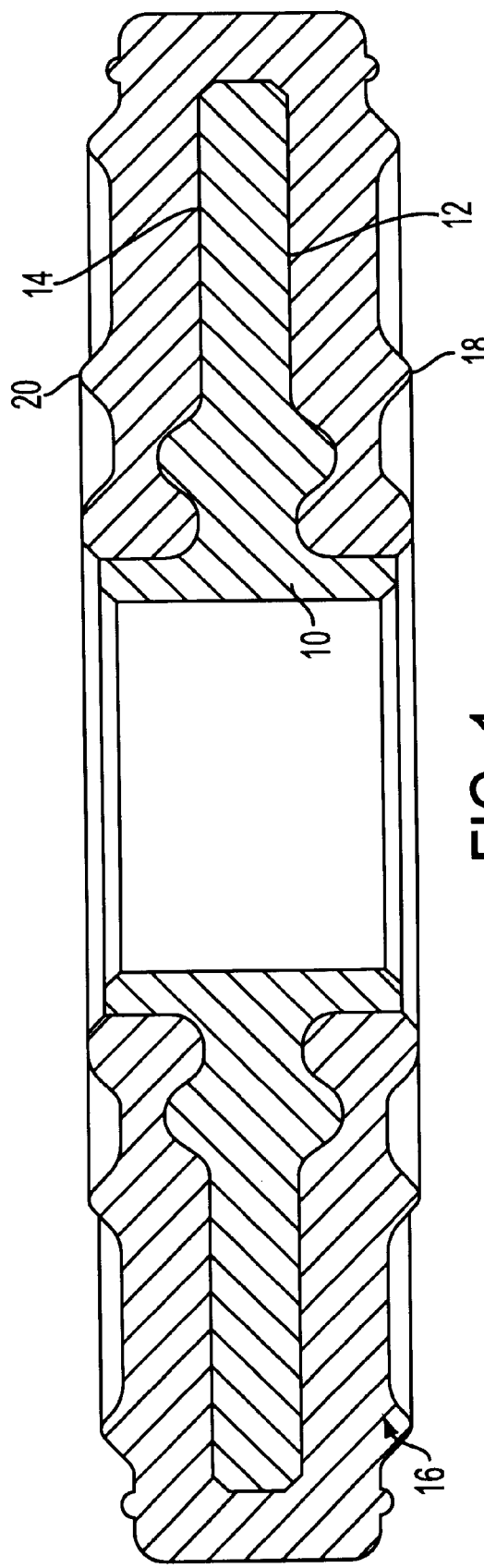
FIG. 1 is an enlarged, cross-sectional view of a prior art insert and bonded rubber sealing element.

Turning first to FIG. 1, a prior art insert and bonded rubber sealing element 10 used in an isolation valve is shown in cross-section. The insert has a first or lower face 12 and a second or upper face 14. As noted above, in the isolation valve environment, it is required that the piston be able to seal along both the first and second surfaces. In the prior art of FIG. 1, this is achieved through use of a bonded rubber sealing element 16 that presents a first elastomeric seal 18 on the first face of the piston and a second elastomeric seal 20 on the second face of the piston. Although effective in operation, this part has come under scrutiny because of the high cost associated with its manufacture.

Figure 2:
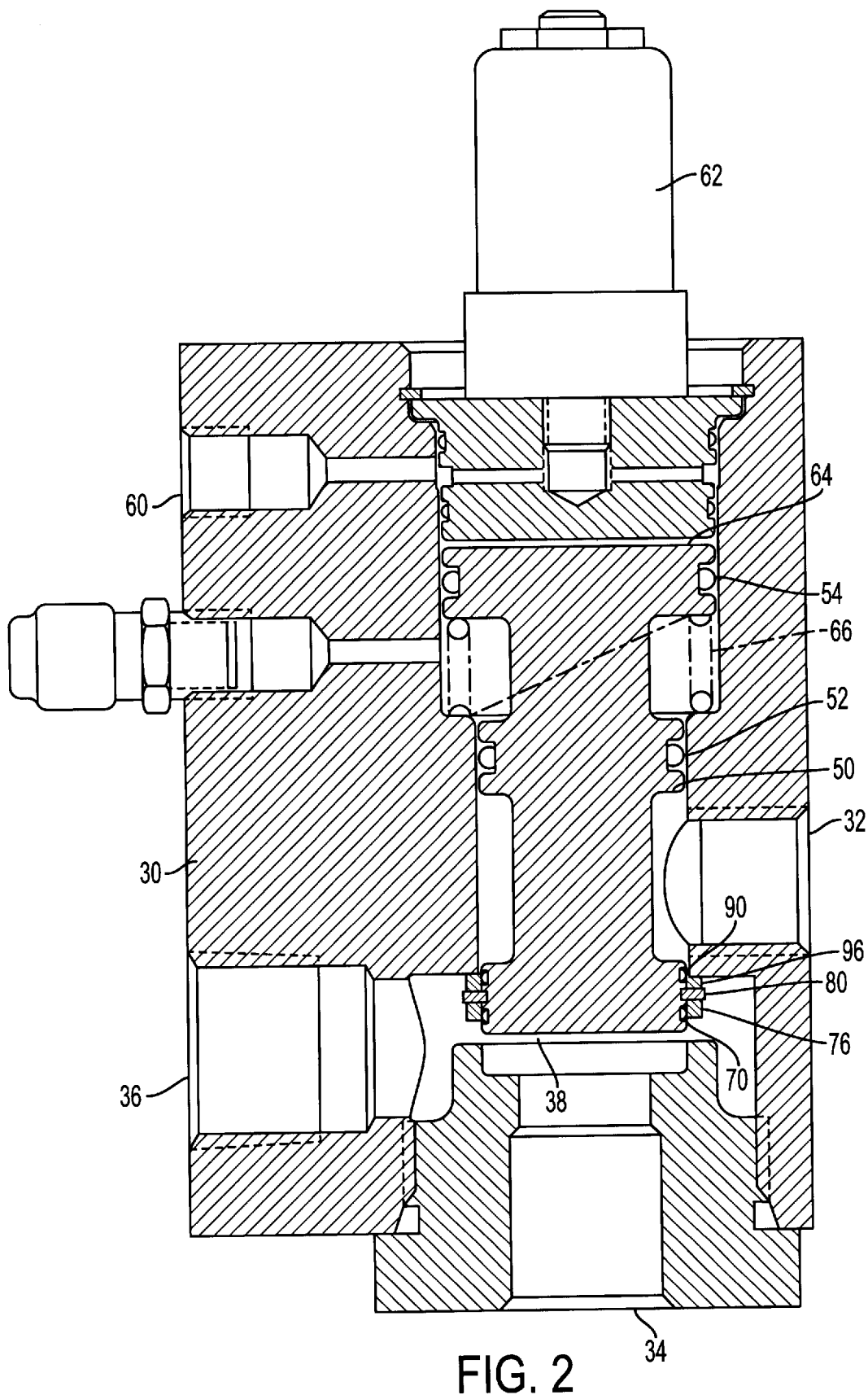
FIG. 2 illustrates the valve assembly, partially in cross-section.

FIG. 2 illustrates one preferred use of the present invention, namely, in the environment of an isolation valve 30. The valve includes a housing 30, having a first or primary supply port 32, a second or backup port 34, and a third port, also referred to as an outlet or delivery port 36. All three ports communicate with a valve chamber 38. Dimensioned for movement in the chamber 38 is a valve member or piston 50. The piston includes first and second seal members 52, 54, respectively, that provide a slidable, sealing engagement with internal bores of the housing in a manner generally well known in the art. A control port 60 provides a constant supply of pressurized air. A solenoid actuator 62, the details of which are conventional in the art, is selectively actuated to allow the supply air from the control port to reach an upper face 64 of the piston. For example, this occurs when the electronic braking system (EBS) actuates the solenoid and establishes a flow path from the control port to the upper side of the piston. The pressure acting on the upper face of the piston exerts a downward force that overcomes an upward or biasing force of spring 66. Thus, in the absence of control pressure reaching the upper face 64 of the piston, the spring urges the piston to the position illustrated in FIG. 2.

Figure 3:
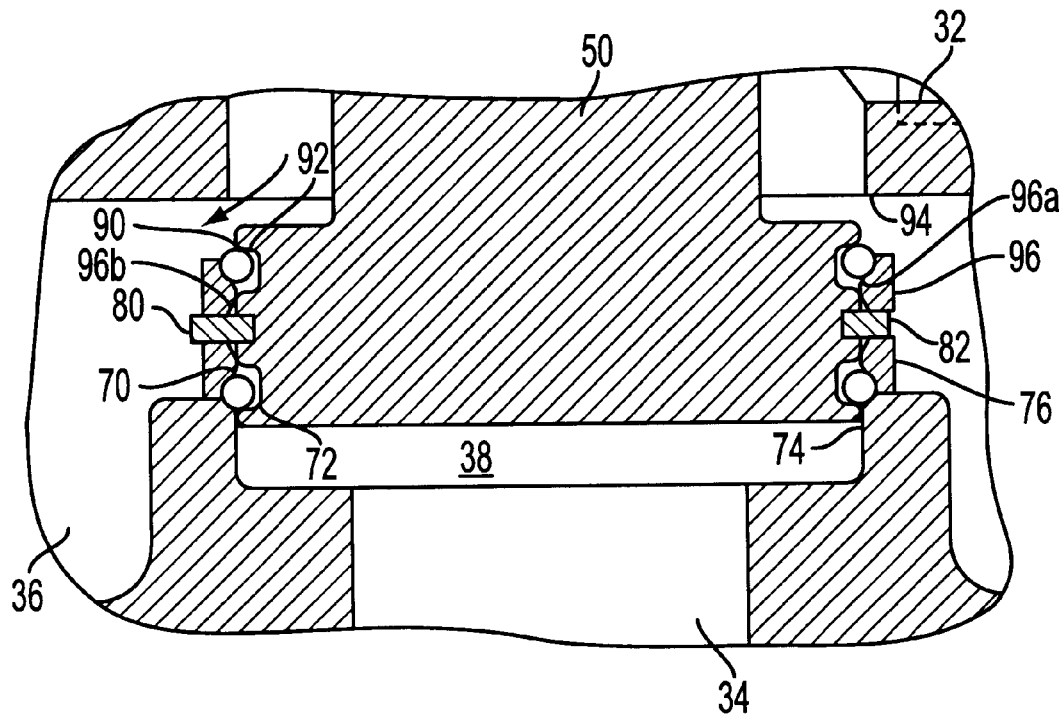
FIG. 3 is an enlarged view, in cross-section, of the piston in a first position.
Figure 4:
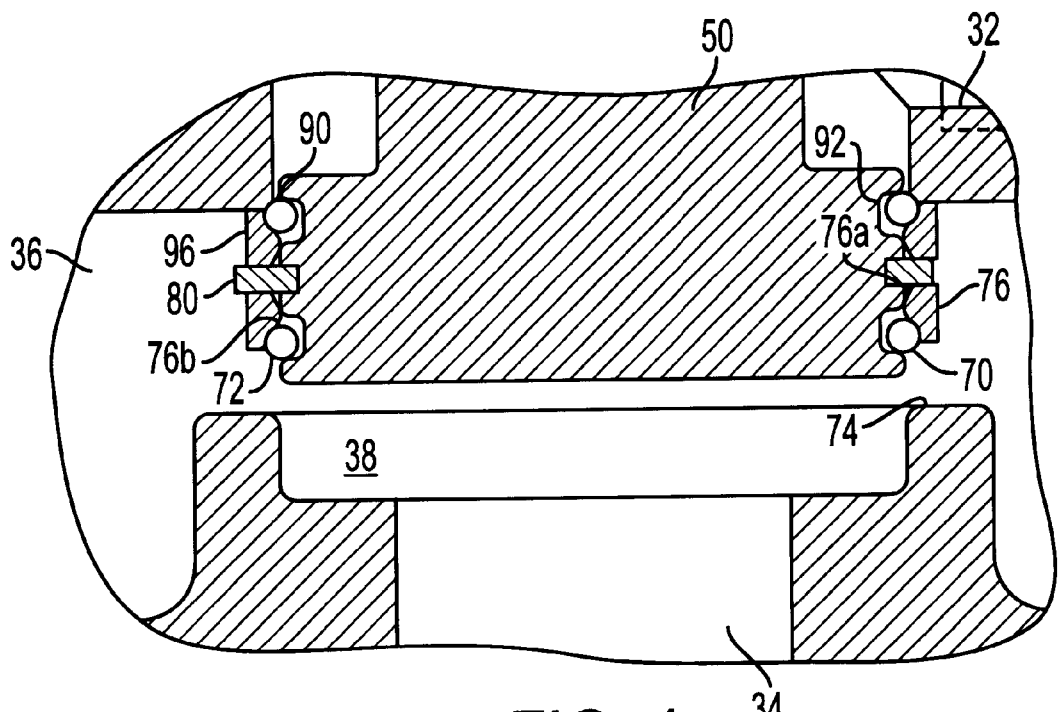
FIG. 4 is a view similar to FIG. 3 with the piston shown in a second position.

With continued reference to FIG. 2, and additional reference to FIGS. 3 and 4, the details of the present invention will be described. FIG. 3 illustrates the piston in a first position when the solenoid is actuated and supply pressure from control port 60 reaches the upper face of the piston. The piston moves to the position shown in FIG. 3 and establishes communication between the primary supply port 32 and the delivery port 36. Simultaneously, communication between the backup port 34 and the delivery port 36 is precluded. Specifically, a first seal member, such as O-ring 70, that is received in groove 72 in the piston engages valve seat 74. The O-ring is dimensioned relative to the first groove so that it protrudes outwardly and is adapted for sealing engagement with the valve seat. A first collar 76, which includes first and second inner tapers 76a, 76b, at opposite ends thereof, partially covers the O-ring 70 and maintains it in the groove even under relatively high pressure conditions.

The collar 76 is a continuous annulus that has an inner diameter adapted to freely slide over the outer diameter of the piston and an outer diameter that selectively engages a retaining ring, such as split ring 80, that is received in a second groove 82 in the piston. The retaining ring provides a stop surface that engages the first collar and limits further advancement of the piston once the opposite end of the first collar engages a surface adjacent the valve seat 74. The first collar further includes a tapered region 74a at one end that cooperates with and retains the first O-ring in the groove. Preferably, the first collar includes a tapered region 74b at its opposite end for the same purpose. In this manner, the first collar can be inserted over the piston in either direction and assure that the retaining function is achieved.

A second seal member or O-ring 90 is received in a third groove 92 in the piston. It selectively cooperates with a second valve seat 94 in a second position of the piston (FIG. 4). The second position of FIG. 4 represents an inoperative state, e.g., a failure, in the EBS system. If the solenoid does not actuate, pressurized air from the control port fails to reach the upper face of the piston. Under those circumstances, the spring 66 urges the piston upwardly so that the second seal member 90 engages the seat 94.

Similarly, a second collar 96 is partially received over the second seal member. Like the first collar, it is a continuous annulus that has an inner diameter greater than the maximum diameter of the piston. This allows the collar to freely slide thereover. However, its inner diameter is slightly less than the unstressed, outer diameter of the seal member. In addition, the second collar has tapers 96a, 96b, one of which will cooperate with the seal member to continually urge it into its respective groove 92. This is particularly evident in FIG. 4, where the piston is shown in the second position and the seal member 90 is disposed in sealing relationship with the valve seat 94. The second collar engages the housing at one end adjacent the valve seat 94 and engages the retaining ring 80 at its other end. This precludes further movement of the piston in that direction.

The valve body is a typically a conventional die-cast aluminum component. The piston and the first and second collars are likewise aluminum. The O-rings are preferably formed of rubber using conventional molding techniques or any suitable elastomeric substitute.

Through careful dimensioning of the first and second collars, the following method of assembly is achieved. First, one of the seal members, for example, the second seal member 90 is inserted into its associated groove 92. The associated collar 96 is then slid over the piston because of the dimensional relationship noted above. Thereafter, the retaining ring 80, which is a split ring assembly, is received in place in groove 82. The assembled collar will abuttingly engage the second seal member at one end and the retaining ring at its other end.

The other seal member, in this instance the first seal member, is then inserted into its associated groove 72 on the piston. Due to the elastomeric nature of the O-ring, the first collar 76 can be advanced to its assembled location between the O-ring and the retaining ring by urging the collar over the second seal member (i.e., squeezing the first collar over the second O-ring with some predetermined force). Once assembled, the first collar is disposed in abutting engagement with the O-ring at one end and with the retaining ring at the other end.

It is also contemplated that the first collar 76 can be assembled onto the piston prior to installing the first seal member 70 into its groove 72. However, it is rather difficult to accurately locate the seal member in its groove so that the preferred method of initially mounting the first O-ring into its groove followed by assembling the first collar thereover is preferred.

As briefly described above, the retaining ring acts as a shoulder for both collars and in combination with the collars limits travel of the piston. During normal operation the piston is actuated and the lower O-ring seals on a lower seat which is formed into a cap nut. This blocks flow from the traditional pneumatic braking system and allows air from the electronic braking system to be delivered to the brake chambers. In the event of an electronics failure, the upper O-ring seals on an upper seat that is formed in the valve body. This allows air from the pneumatic backup braking system to be delivered to the brake chambers.

The invention has been described with reference to the preferred embodiments. Modifications or alterations will occur to others upon a reading and understanding of this specification. The invention is intended to include such modifications and alterations insofar as they fall within the scope of the appended claims or the equivalents thereof.

Having thus described the invention, it is now claimed:

1. A valve assembly comprising:
   a housing having a chamber and first, second, and third ports in communication therewith;
   a piston received in the chamber for selective movement between first and second positions providing alternate communication between the first and third ports in the piston first position and between the second and third ports in the piston second position; and
   a seal assembly on the piston including first and second seal members, first and second collars, and a rigid retaining ring, the first seal member received in a first groove on the piston and the second seal member received in a second groove on the piston spaced from the first groove, the rigid retaining ring received in a third groove interposed between the seal members and the rigid retaining ring dimensioned for abutting engagement with the first and second collars.

2. The valve assembly of claim 1 wherein the rigid retaining ring is a split ring.

3. The valve assembly of claim 2 wherein each of the first and second collars is a complete annulus.

4. The valve assembly of claim 3 wherein each of the first and second seal members is a complete annulus.

5. The valve assembly of claim 1 wherein the rigid retaining ring has an internal diameter less than an inner diameter of the first and second collars.

6. The valve assembly of claim 5 wherein the rigid retaining ring has a radial dimension adapted for axial abutment with the first and second collars.

7. The valve assembly of claim 6 wherein the inner diameter of each of the first and second collars is greater than a maximum diameter of the piston.

8. The valve assembly of claim 5 wherein the inner diameter of each of the first and second collars is greater than a maximum diameter of the piston.

9. The valve assembly of claim 1 wherein each of the first and second collars includes a tapered opening at one end adapted to receive a portion of a respective seal member therein.

10. The valve assembly of claim 9 wherein each of the first and second collars has an inner diameter greater than a maximum diameter of the piston thereby permitting the collars to move axially relative to the piston.

11. A method of installing a seal assembly including first and second elastomeric seal members, first and second collars, and a rigid retaining ring to a piston having first, second and third axially spaced grooves comprising the steps of:

advancing the first seal member over the piston for receipt in the first groove;

advancing the first collar over the piston for receipt between the first and second grooves;

advancing the rigid retaining ring into the second groove subsequent to the first collar advancing step;

advancing the second seal member over the piston for receipt in the third groove; and advancing the second collar over the piston for receipt between the second and third grooves.

12. The method of claim 11 wherein the first seal member advancing step precedes the first collar advancing step.

13. The method of claim 11 wherein the second collar member advancing step follows the second seal member advancing step.

14. The method of claim 11 wherein the first and second seal member advancing step includes stretching the seal member over the piston whereby the seal members are elastically retained in the respective first and third grooves.

15. A valve assembly comprising:

a housing having first, second, and third ports communicating with a chamber, the first and second ports disposed in facing relation along a common axis;

a piston dimensioned for movement in the chamber that selectively opens and closes communication of the first and second ports with the valve chamber and third port; and a seal assembly on the piston including first and second seal members, first and second collars, and a rigid retaining ring, the first seal member received in a first groove on the piston and the second seal member received in a second groove on the piston spaced from the first groove, the rigid retaining ring received in a third groove interposed between the seal members and the rigid retaining ring dimensioned for abutting engagement with the first and second collars.

16. The valve assembly of claim 15 wherein the rigid retaining ring is a split ring.

17. The valve assembly of claim 16 wherein each of the first and second collars is a complete annulus.

18. The valve assembly of claim 15 wherein each of the first and second seal members is a complete annulus.

* * * * *